United States Patent
Imada et al.

(10) Patent No.: US 9,583,916 B2
(45) Date of Patent: Feb. 28, 2017

(54) ALUMINA SINTERED BODY AND SPARK PLUG USING THE SAME

(71) Applicant: DENSO CORPORATION, Kariya, Aichi-pref. (JP)

(72) Inventors: Shota Imada, Kariya (JP); Hirofumi Suzuki, Kariya (JP); Hiroshi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/053,256

(22) Filed: Feb. 25, 2016

(65) Prior Publication Data

US 2016/0254651 A1    Sep. 1, 2016

(30) Foreign Application Priority Data

Feb. 27, 2015  (JP) .................................. 2015-038312

(51) Int. Cl.
*H01T 13/38*   (2006.01)
*C04B 35/00*   (2006.01)

(52) U.S. Cl.
CPC .............. *H01T 13/38* (2013.01); *C04B 35/00* (2013.01)

(58) Field of Classification Search
CPC ......... H01T 13/38; H01T 14/00; H01T 13/46; C04B 35/00
See application file for complete search history.

(56) References Cited

U.S. PATENT DOCUMENTS

| 2007/0298245 A1* | 12/2007 | Ogata | C04B 35/117 428/329 |
| 2008/0124266 A1* | 5/2008 | Ogata | C04B 35/117 423/263 |
| 2010/0229813 A1* | 9/2010 | Ogata | C04B 35/111 123/146.5 R |
| 2011/0077141 A1 | 3/2011 | Walker et al. | |
| 2011/0251042 A1* | 10/2011 | Araki | C04B 35/111 501/32 |
| 2016/0023953 A1 | 1/2016 | Imada | |

FOREIGN PATENT DOCUMENTS

| JP | H11-195473 | 7/1999 |
| JP | 2000-247729 | 9/2000 |
| JP | 2010165487 A * | 7/2010 |
| JP | 2011-219301 | 11/2011 |
| JP | 2013-529355 | 7/2013 |

* cited by examiner

*Primary Examiner* — Tracie Y Green
(74) *Attorney, Agent, or Firm* — Nixon & Vanderhye P.C.

(57) ABSTRACT

An alumina sintered body has a main phase made of alumina crystals, a first dispersed phase made of $MgAl_2O_4$ dispersed in the main phase, and a second dispersed phase made of $SiO_2$ and/or $CaO$ dispersed in the main phase. A content ratio of the main phase is within a range from not less than 98% to less than 98%. The alumina sintered body satisfies a relationship of $100 \times I_2/I_1 \geq 5.5\%$, where $I_1$ indicates a maximum peak height intensity derived from alumina, and $I_2$ indicates a maximum peak height intensity derived from $MgAl_2O_4$ in a X-ray diffraction of the alumina sintered body. An area ratio of the second dispersed phase on a surface of the alumina sintered body is not more than 15.2%. A spark plug has a central electrode, a ground electrode and an insulator made of the alumina sintered body having the specific features previously described.

10 Claims, 7 Drawing Sheets

PET/CH₃

PET/CH₃

ALUMINA SINTERED BODY AND SPARK PLUG USING THE SAME

CROSS-REFERENCE TO RELATED APPLICATION

This application is related to and claims priority from Japanese Patent Application No. 2015-38312 filed on Feb. 27, 2015, the contents of which are hereby incorporated by reference.

BACKGROUND OF THE INVENTION

1. Field of the invention

The present invention relates to an alumina sintered body and a spark plug having an insulator using the alumina sintered body. The alumina sintered body contains alumina crystals as a main phase, a crystal phase dispersed in the alumina crystals and a glass phase formed in a crystal boundary of the alumina crystals.

2. Description of the Related Art

Alumina sintered bodies are used as an insulator as an automobile component because of having a superior heat resistance and withstand voltage properties. For example, an alumina sintered body is used as an insulator of a spark plug used in an internal combustion engine of a motor vehicle. It is preferable for the insulator of the spark plug to be made of an alumina sintered body having superior withstand voltage properties. For example, patent document 1, Japanese patent laid open publication No. 2013-529355 has proposed a ceramic material containing alumina, oxide of group II alkaline earth metal and silicon dioxide.

Automobile fuels include alcohols such as ethanol in addition to fossil fuel such as gasoline and light oil. Because a conventional spark plug uses an insulator made of ceramic material, there is a problem of often causing corrosion of the insulator often by alkaline impurities such as Na (sodium) contained in alcohol fuel. Research and development of insulators used in spark plugs have been performed from one point of view to improve withstand voltage, but not performed adequately from the point of view of improving corrosion resistance of the spark plug.

SUMMARY

It is therefore desired to provide an alumina sintered body having superior alkali corrosion resistance properties and a spark plug using the alumina sintered body.

An exemplary embodiment provides an alumina sintered body having a main phase, a first dispersed phase and a second dispersed phase. The main phase is made of alumina crystals. The first dispersed phase is made of $MgAl_2O_4$ dispersed in the main phase. The second dispersed phase is made of $SiO_2$ and/or CaO dispersed in the main phase. A content ratio of the main phase is within a range from not less than 90% to less than 98%. The alumina sintered body satisfies a relationship of $100 \times I_2/I_1 \geq 5.5\%$, where $I_1$ indicates a maximum peak height intensity derived from alumina and $I_2$ indicates a maximum peak height intensity derived from $MgAl_2O_4$ in a X-ray diffraction of the alumina sintered body. An area ratio of the second dispersed phase on a surface of the alumina sintered body is not more than 15.2%.

The exemplary embodiment further provides a spark plug having an insulator made of the alumina sintered body previously described.

That is, the alumina sintered body has the main phase, the first dispersed phase and the second dispersed phase. In particular, the main phase contains the alumina crystals of the specific content within a range from not less than 98% to less than 98%. The first dispersed phase contains $MgAl_2O_4$ crystals dispersed in the first phase. The second dispersed phase contains $SiO_2$ and/or CaO dispersed in the main phase. The first dispersed phase is present in the main phase with the specific ratio indicated by the maximum peak height intensity previously described. The second dispersed phase is present with the specific area ratio in the main phase. This compositional structure of the alumina sintered body has excellent alkali corrosion resistance.

Further, the spark plug has the insulator made of the alumina sintered body having excellent alkali corrosion resistance properties previously described. Accordingly, it is possible to apply the spark plug to an internal combustion engine using a fuel which contains alkali impurities containing sodium (Na).

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an alumina sintered body and a spark plug using the alumina sintered body according to an exemplary embodiment with reference to FIG. 1 to FIG. 9.

Figure 1:
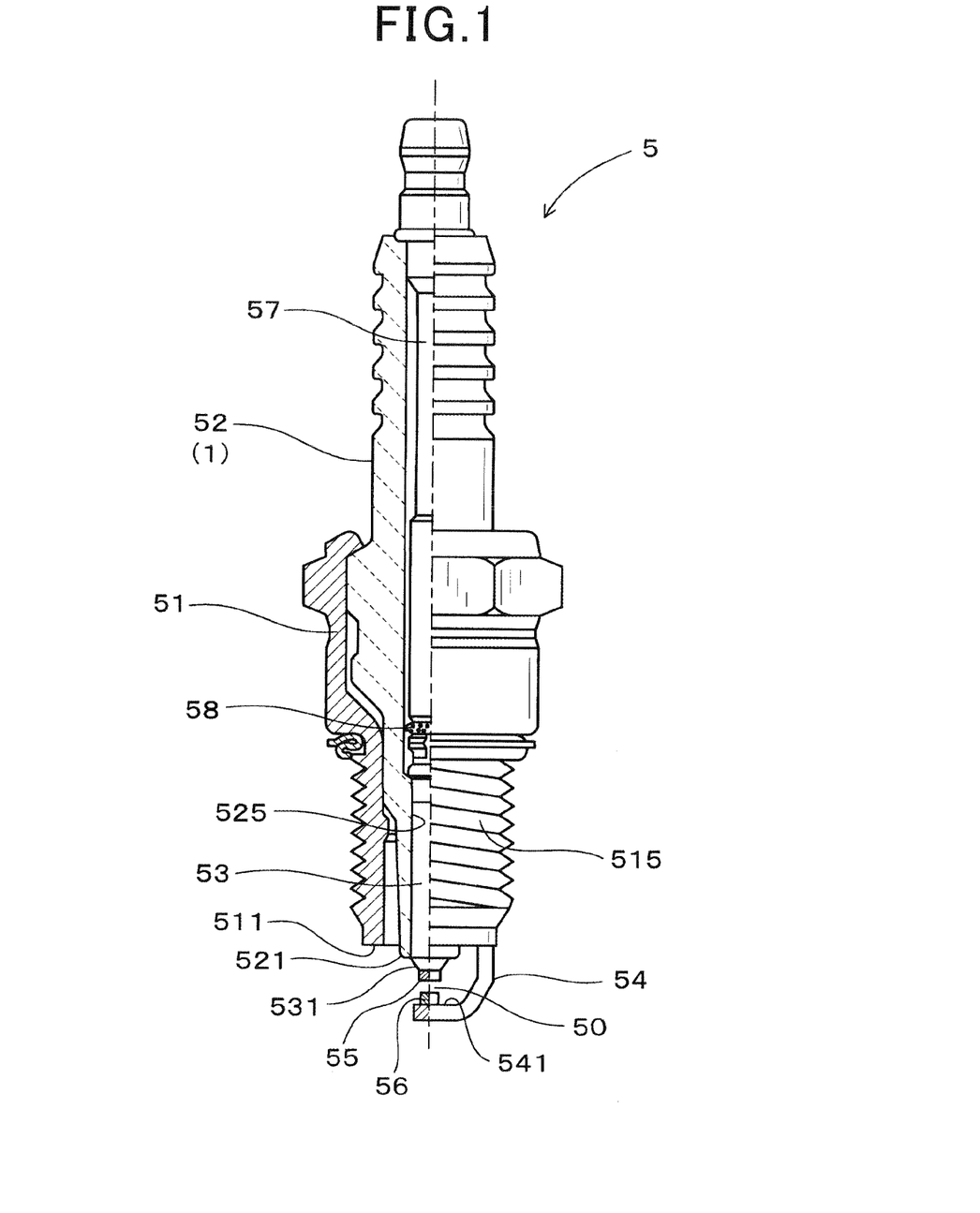
FIG. 1 is a view showing a cross section of an entire structure of a spark plug according to an exemplary embodiment of the present invention.

FIG. 1 is a view showing a cross section of an entire structure of the spark plug 5 using the alumina sintered body according to the exemplary embodiment.

The spark plug 5 according to the exemplary embodiment can be applied to internal combustion engines of motor vehicles. The spark plug 5 is inserted and fixed to an engine head portion (not shown) partitioned in a combustion chamber in an engine cylinder block (not shown) of an internal combustion engine. The spark plug 5 has a mounting metal member 51 of a cylindrical shape. The mounting metal member 51 is made of a steel member made such as of low carbon steel having electrical conductivity.

A mounting screw section 515 is formed on an outer periphery of the mounting metal member 51. Through the mounting screw section 51, the spark plug 5 is fixed to the engine cylinder block (not shown) of the internal combustion engine.

In the spark plug 5 according to the exemplary embodiment, the mounting screw section 515 has a nominal diameter of not more than 14 mm. That is, the mounting screw section 515 is designated on the basis of M14 or less of Japanese Industrial Standards (JIS).

An insulator 52 is stored in and fixed to the inside of the mounting metal member 51. The insulator 52 is made of an alumina sintered body. A front section 521 of the insulator 52 is projected outside from a front section 511 of the mounting metal member 51.

A central electrode 53 of the spark plug 5 is arranged in and fixed to a central axial hole 525 of the insulator 52. The central electrode 53 is electrically insulated from the mounting metal member 51 by the insulator 52. For example, the central electrode 53 has a cylindrical body made of a metal member having superior heat resistance and corrosion resistance properties. The metal member has a structure having an inside member and an outside member. The inside member of the metal member is made of copper, etc. The outside member of the metal member is made of nickel alloy, etc.

As shown in FIG. 1, the central electrode 53 of the spark plug 5 is arranged so that a front section 531 of the central electrode 53 is projected from the front section 521 of the insulator 52. The central electrode 53 is stored in the mounting metal member 51 so that the front section 531 of the central electrode 53 is projected outside.

On the other hand, a ground electrode 54 of the spark plug 5 has a column shape made of nickel alloy, for example. That is, one end section of the ground electrode 54 is fixed to the front section 511 of the mounting metal member 51 by welding. An intermediate section of the ground electrode 54 is curved to form a character L shape. A side surface 541 of the ground electrode 54 faces the front section 531 of the central electrode 53 through a spark discharge gap 50.

A noble metal chip is formed to project from the front section 531 of the central electrode 53. Further, a noble metal chip is formed on the side surface 541 of the ground electrode 54 to project therefrom. These noble metal chips 55 and 56 are made of iridium (Ir) alloy or platinum (Pt) alloy, etc. The noble metal chip 55 is fixed to an electrode base metal of the central electrode 53 by laser welding or resistance welding, etc. Similar to the central electrode 53, the noble metal chip 56 is fixed to an electrode base metal of the ground electrode 54 by laser welding or resistance welding, etc.

The spark discharge gap 50 of the spark plug 5 is formed between a front surface of the noble metal chip 55 of the central electrode 53 and a front surface of the noble metal chip 56 of the ground electrode 54. For example, it is possible to form the spark discharge gap 50 having approximately 1 mm length in the spark plug 5.

A stem 57 is formed in the central axial hole 525 at a distal end section of the insulator 52, which is arranged opposite to the front section 521 of the insulator 52. Through the stem 75, the central electrode 53 is detached from the spark plug 5. The stem 57 has a rod shape and electrical conductive properties. The stem 57 is electrically connected to the central electrode 53 through a glass seal 58 having electrical conductive properties in the inside of the central axial hole 525 of the insulator 52.

Next, a description will now be given of the insulator 52 to be used in the spark plug 5 according to the exemplary embodiment. The insulator 52 is made of the alumina sintered body 1.

Figure 2:
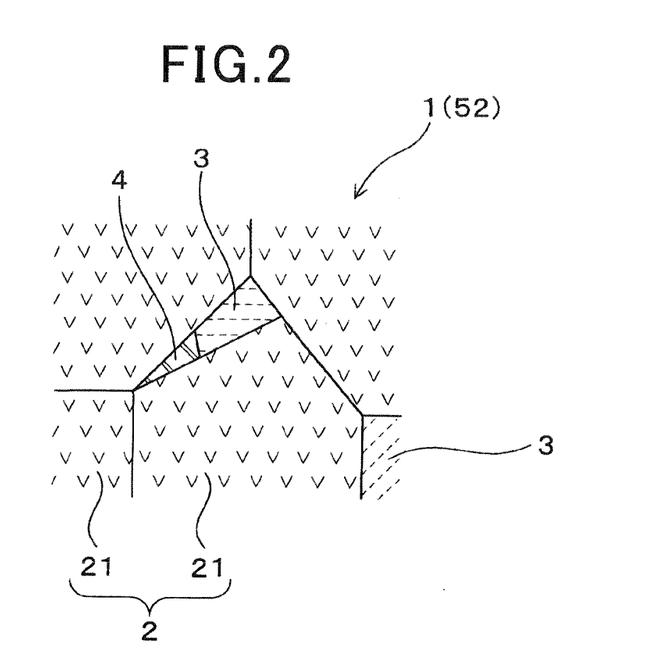
FIG. 2 is a view showing a partially enlarged cross section of an alumina sintered body used in the spark plug shown in FIG. 1.

FIG. 2 is a view showing a partially enlarged cross section of the alumina sintered body to be used for the spark plug 5 shown in FIG. 1.

As shown in FIG. 2, the alumina sintered body 1 according to the exemplary embodiment has at least a main phase 2 made of alumina crystals, a first dispersed phase 3 and a second dispersed phase 4. The first dispersed phase 3 is dispersed in the main phase 2, and made of $MgAl_2O_4$ crystals (spinel). The second dispersed phase 4 is dispersed in the main phase 2, and contains $SiO_2$ and/or CaO. It is acceptable to disperse the first dispersed phase 3 and the second dispersed phase 4 into the inside of crystal grains 21 of the alumina crystals or a crystal boundary area (between crystal grains 21).

In the structure of the alumina sintered body 1 according to the exemplary embodiment, the second dispersed phase 4 is a glass phase present in the crystal grains of the alumina crystals 21. However, the concept of the present invention is not limited by this structure. For example, it is acceptable for the alumina sintered body 1 to have the second dispersed phase 4 in which a part of oxide containing Si and/or Ca is crystallized. Further, it is acceptable that the crystallized second dispersed phase 4 is present in the crystal grains of the alumina crystals 21 or in the crystal boundary area of the alumina crystals 21.

The exemplary embodiment produced a plurality of test samples and comparative samples of the alumina sintered body by changing a composition of raw material. That is, the exemplary embodiment prepared test samples 1 to 13 and comparative samples 1 to 13 of the alumina sintered body. The exemplary embodiment used raw materials such as α-alumina, MgO, activated alumina (γ-$Al_2O_3$), $SiO_2$ and/or CaO to produce the alumina sintered body 1.

For example, it is possible to produce the alumina sintered body 1 by performing a first mixing step, a second mixing step, a granulation step, a molding step and firing step using the raw materials previously described.

The first mixing step mixes at least two or more selected from the raw materials $SiO_2$, CaO, MgO and γ-$Al_2O_3$, in liquid such as water. The second mixing step adds α-alumina (main agent) into the mixture obtained in the first mixing step, and further adds remaining raw materials, which have not been added by the first mixing step, and additional amount of the raw materials used in the first mixing step to the mixture. It is possible to adjust the mixing ratio of the raw materials used in the first mixing step and the second mixing step on the basis of a necessary content of each of the main phase 2, the second dispersed phase 3 and the second dispersed phase 4. It is also acceptable for the first mixing step and the second mixing step to use a dispersant and a binder.

In order to produce the alumina sintered body 1, the exemplary embodiment used activated alumina $\gamma$-$Al_2O_3$ in addition to $\alpha$-alumina (main agent), and performed at least two mixing steps such as the first mixing step and the second mixing step, and mixed in advance at least two or more selected from the raw materials, i.e. sintering agents such as silicon dioxide ($SiO_2$), calcium oxide (CaO), magnesium oxide (MgO) and activated alumina ($\gamma$-$Al_2O_3$) before mixing the main raw material of $\alpha$-alumina. This makes it possible to promote the chemical reaction between the sintering agents. As a result, the exemplary embodiment makes it possible to produce the alumina sintered body 1 in which the first dispersed phase 3 made of $MgAl_2O_4$ crystals (i.e. spinel) is generated with a predetermined mixing ratio. This makes it possible to produce the alumina sintered body 1 having an increased sintered density. In particular, it is preferable for the alumina sintered body 1 to have a sintered density of not less than 95% in relative density of its theoretical maximum density.

The granulation step performs a spray dry method to dry the slurry mixture obtained after the second mixing step in order to obtain granulated powder. The molding step molds the granulated power obtained by the granulation step to a molded body having a predetermined shape. The firing step fires the molded body to produce the alumina sintered body 1 according to the exemplary embodiment. For example, the firing step fires the molded body at a temperature within a range of 1450° C. to 1650° C.

A description will now be given of the method of producing the alumina sintered body 1 according to the exemplary embodiment. The exemplary embodiment prepared $\alpha$-alumina as main agent having a high purity of not less than 99.9 mass % and average particle size within a range of 0.4 to 3.0 μm. In order to measure the average particle size of $\alpha$-alumina, a laser diffraction scattering method detected a particle distribution of $\alpha$-alumina at a volume integrated value of 50%. The exemplary embodiment prepared magnesium oxide (MgO), silicon dioxide ($SiO_2$), calcium oxide (CaO) and activated alumina ($\gamma$-$Al_2O_3$) as sintering agents of $\alpha$-alumina. Each of the sintering agents has a purity of not less than 97 mass %.

Next, water was added into a mixing vessel equipped with a stirring wing. After this, the sintering agents were added into the mixing vessel (in the first mixing step). Magnesium oxide powder and silicon dioxide powder, and activated alumina powder were used as the sintering agents. In particular, calcium oxide powder was also used appropriately as the sintering agent. That is, some examples according to the exemplary embodiment used the calcium oxide powder, and other examples did not use the calcium oxide powder.

Next, the main agent ($\alpha$-alumina powder), a binder of a specific amount, and remaining sintering agents, which were not added in the first mixing step, were added into the mixing vessel. The main material, these sintering agents and water were stirred in the mixing vessel to produce a mixture (in the second mixing step).

An added amount of the sintering agents in the first mixing step and the second mixing step were adjusted to have a specific total amount. The first and second mixing steps produced the mixture slurry in which the main agent and the sintering agents were dispersed in the water. The test samples 1 to 13 and the comparative samples 1 to 13 had a different mixing ratio of the main agent and the sintering agents.

Next, the mixture slurry produced by the steps previously described was dried by using granulation spray drying to produce granulated powder (in the granulated powder production step). The produced granulated powder was molded to produce a mold body having an insulator shape (in the molding step).

Next, the molded body was fired to produce the alumina sintered body as the test samples (in the firing step). The molded body was fired at a temperature within a range of 1450° C. to 1650° C. for one to three hours.

On the other hand, the exemplary embodiment produced the comparative samples without using activated alumina powder. The exemplary embodiment prepared the comparative samples using $\alpha$-alumina as main agent and sintering agents which were mixed simultaneously in the mixing vessel. The exemplary embodiment used the same method of producing the comparative samples and the test samples.

The exemplary embodiment adjusted the mixing ratio of the $\alpha$-alumina powder and each of the sintering agents, and produced the alumina sintered bodies (which correspond to the test samples 1 to 13 and the comparative samples 1 to 13) having a different peak height intensity derived from alumina and an area of the second dispersed area. The Table 1, which will be described later, shows a content of alumina contained in the alumina sintered body as each of the test samples and comparative samples. This alumina content indicates a total amount of the $\alpha$-alumina and $\gamma$-alumina in each of the test samples and the comparative samples.

The peak strength of the alumina sintered body was measured by the following method. The exemplary embodiment used an X-ray diffraction device CMF-SmartLab manufactured by Rigaku Corporation under the following measurement conditions:

X ray: Cu—K$\alpha$ ray; ACC. V: 40 kV; B.C.: 20 mA; Beam size: 0.3 mm; Measuring method: $2\theta/\theta$ method; Step: 0.02°, Measuring time: 5°/minutes.

Figure 3:
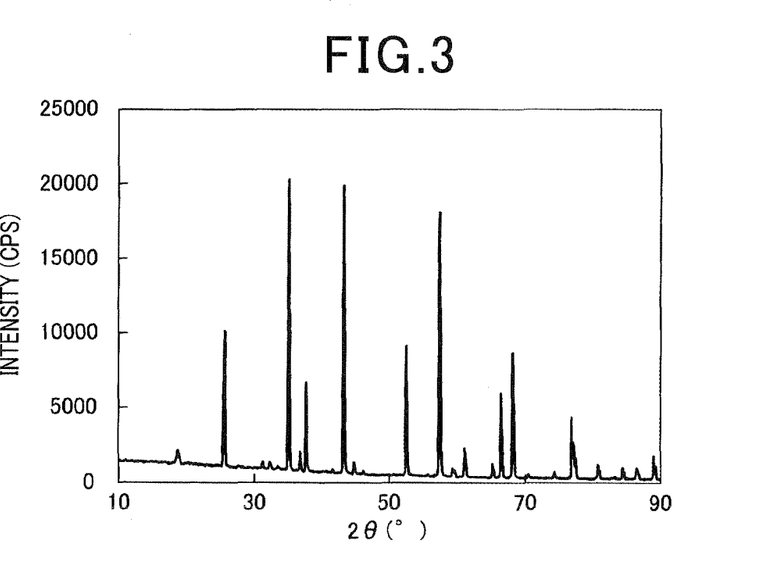
FIG. 3 is a view showing a X-ray diffraction pattern of the alumina sintered body according to a test sample 9.
Figure 4:
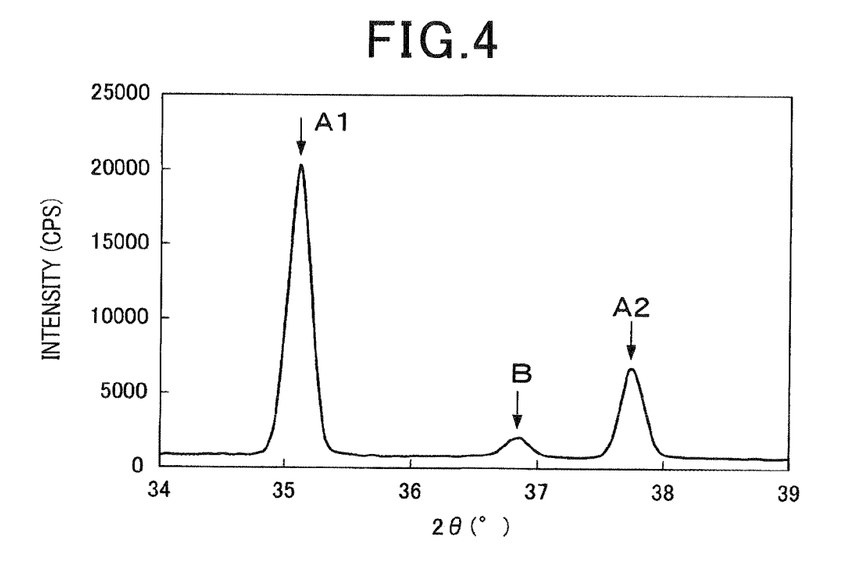
FIG. 4 is a partially enlarged view of the X-ray diffraction pattern of the alumina sintered body shown in FIG. 3.

For example, FIG. 3 and FIG. 4 show an example of an X-ray diffraction pattern of the ninth test sample as the alumina sintered body. That is, FIG. 3 is a view showing an X-ray diffraction pattern of the alumina sintered body according to the test sample 9. FIG. 4 is a partially enlarged view of the X-ray diffraction pattern of the alumina sintered body shown in FIG. 3. In particular, FIG. 4 is an enlarged view within a range of $2\theta/\theta=34°$ to 39° shown in FIG. 3. The arrows A1 and A2 shown in FIG. 4 indicate peak height intensities derived from alumina. The arrow A3 shown in FIG. 4 indicates a peak height intensity derived from $MgAl_2O_4$ (spinel).

The exemplary embodiment calculates the peak strength ratio ($100 \times I_2/I_1$ on the basis of the maximum peak height intensity $I_1$ derived from alumina (designated by the arrow A1) and the maximum peak height intensity peak $I_2$ derived from $MgAl_2O_4$ (spinel) (designated by the arrow B). The calculated peak height intensity ratio indicates the ratio of the spinel in the alumina sintered body in each of the test samples and the comparative samples.

Background noise was not eliminated within the range of 10 to 90° of $2\theta/\theta$ during the calculation of the peak height intensity ratio. The exemplary embodiment detects the generation of $MgAl_2O_4$ (spinel) in the alumina sintered body as the test samples and the comparative samples when detecting three or more peak height intensities in ±5° of the X-ray diffraction peak positions derived from $MgAl_2O_4$ registered in the database of the ICDD® (the International Center for Diffraction Data®).

The exemplary embodiment performed the existence area of the second dispersed phase on the surface of the alumina sintered body by using electron probe micro analyzer (EPMA) analysis. The exemplary embodiment used the EPMA-1720 manufactured by the SHIMADZU CORPORATION under the following measurement conditions:

ACC. V: 15 kV; Beam size; Minimum value (less than 5 μm) of the device; Beam current: 50 nA; Analysis mode: Stage scan; Step size: 0.3 μm; Data point: 300×300; Area size X: 0.09 mm, Area size Y: 0.09 mm; Sampling time: 20 millisecond; and Trace: None.

Specifically, the exemplary embodiment performed the EPMA analysis on optional points on the surface of the alumina sintered body as the test samples and the comparative samples under the measurement conditions previously described. The exemplary embodiment performed the EPMA analysis at a magnification of 100,000.

Figure 5A:
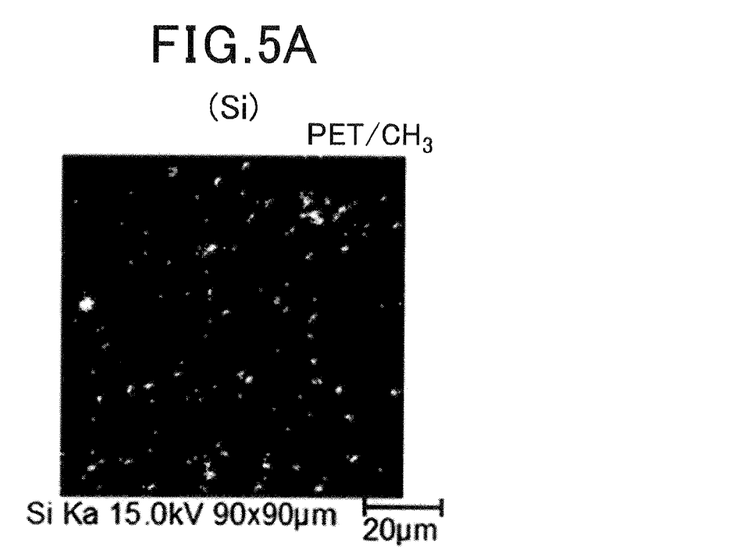
FIG. 5A is a photograph showing the analysis results (after the binarization process) of Si contained in the alumina sintered body according to a test sample 4 measured by an electron probe micro analyzer (EPMA)
Figure 5B:
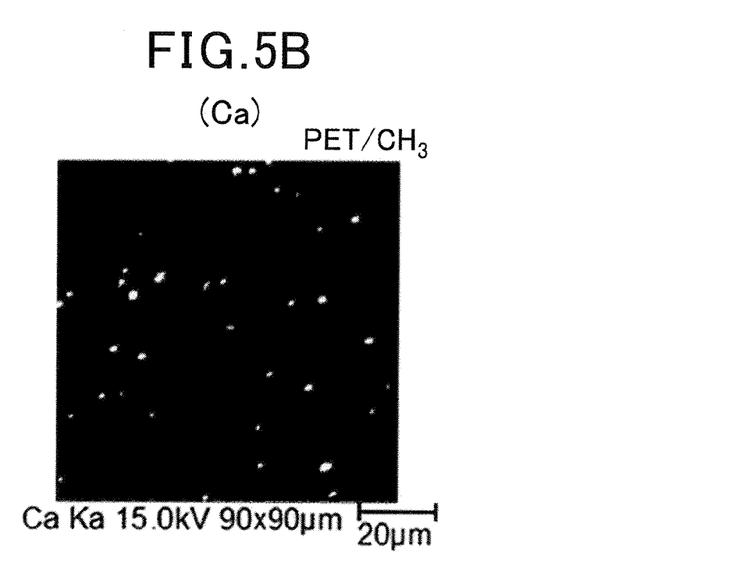
FIG. 5B is a photograph showing analysis results (after the binarization process) of Ca contained in the alumina sintered body according to a test sample 4 measured by the EPMA.
Figure 6A:
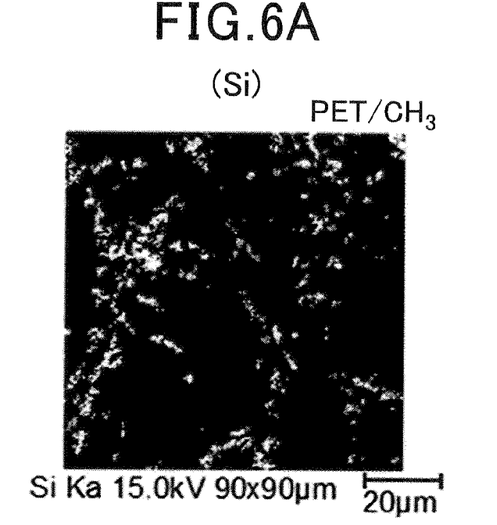
FIG. 6A is a photograph showing the analysis results (after the binarization process) of Si contained in an alumina sintered body according to a comparative sample 3 measured by the EPMA.
Figure 6B:
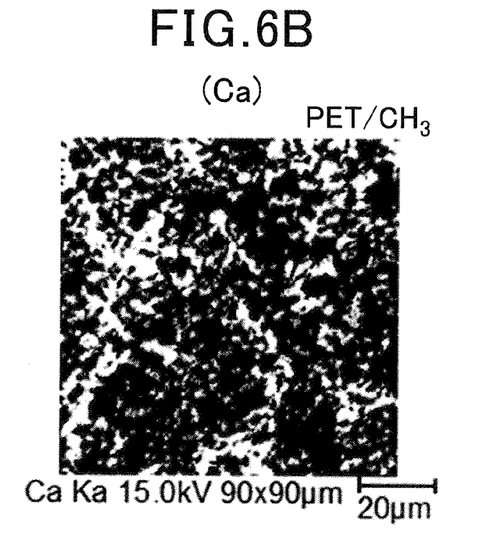
FIG. 6B is a photograph showing the analysis results (after the binarization process) of Ca contained in the alumina sintered body according to the comparative sample 3 measured by the EPMA.

Next, the exemplary embodiment performed the binarization of the EPMA analysis results of each of the elements Si and Ca in each of the test samples and the comparative samples on the basis of the following standard. For example, FIG. 5 and FIG. 6 shows the results of the binarization of the EPMA analysis of the alumina sintered body according to the fourth test sample and the third comparative sample. FIG. 5A is a photograph showing the analysis results (after the binarization process) of Si contained in the alumina sintered body according to the test sample 4 measured by the electron probe micro analyzer (EPMA). FIG. 5B is a photograph showing the analysis results (after the binarization process) of Ca contained in the alumina sintered body according to the test sample 4 measured by the EPMA.

In FIG. 5A, the white to gray areas indicates Si contained in the alumina sintered body according to the fourth test sample. Similarly, in FIG. 5B, the white to gray areas indicates Ca contained in the alumina sintered body according to the fourth test sample.

FIG. 6A is a photograph showing the analysis results (after the binarization process) of Si contained in the alumina sintered body according to a comparative sample 3 measured by the EPMA. FIG. 6B is a photograph showing the analysis results (after the binarization process) of Ca contained in the alumina sintered body according to the comparative sample 3 measured by the EPMA.

In FIG. 6A, the white and gray areas indicate Si contained in the alumina sintered body according to the third comparative sample. Similarly, in FIG. 6B, the white and gray areas indicate Ca contained in the alumina sintered body according to the third comparative sample. The exemplary embodiment measured the total sum of:

the existing area of Si (i.e. $SiO_2$) in the measured area on the basis of the analysis results of the EPMA after the binarization process, and the existing area of Ca (i.e. CaO) in the measured area on the basis of the analysis results of the EPMA after the binarization process.

The obtained sum of the existing areas of Si and Ca indicates the area ratio of the second dispersed phase in the alumina sintered body.

It can be determined that the second dispersed phase 4 made of $SiO_2$ and/or CaO in the alumina sintered body 1 according to the exemplary embodiment forms a glass phase for the following reasons (1) and (2):

(1) No peak height intensity derived from an oxide crystal containing Si or an oxide crystal containing Ca is present in the X-ray diffraction measurement result; and (2) No overlapped area between the area of Al or Mg and the area of Si or Ca (see FIG. 5A, FIG. 5B, FIG. 6A and FIG. 6B) is present in the EPMA analysis results.

It is possible to adjust the ratio in area of the second dispersed phase 4 on the surface of the alumina sintered body by adjusting the amount of silica and/or calcia to alumina as raw materials. The ratio in area of the second dispersed phase 4 in the alumina sintered body 1 according to the exemplary embodiment indicates the rate in present of the glass phase.

The exemplary embodiment performed the binarization process by the following steps.

A first calibration curve was prepared by using Si standard sample having a purity of not less than 99.9%. The first calibration curve indicates a relationship between a strength ratio (%) of Si and a strength (cps) of Si in EPMA.

Further, a second calibration curve was prepared by using $CaF_2$ standard sample having a purity of not less than 99.9%. The second calibration curve indicates a relationship between a strength ratio (%) of Ca and a strength (cps) of Ca in EPMA. The first calibration curve and the second calibration curve were obtained by using software stored in the EPMA-1720 manufactured by the SHIMADZU CORPORATION.

The exemplary embodiment calculated the strength ratio (%) of Si contained in $SiO_2$ present in the surface of the alumina sintered body by using the following equation (1).

$$Y_1 = c_1 X_1 + d_1 \quad (1),$$

where $X_1$ indicates the strength (cps) of Si obtained by the EPMA analysis, $Y_1$ indicates the strength ratio (%) of Si, and $c_1$ and $d_1$ are constants of the first calibration curve of Si.

Further, the exemplary embodiment calculated the strength ratio (%) of Ca contained in CaO present in the surface of the alumina sintered body by using the following equation (2).

$$Y2 = c_2 X2 + d_2 \quad (2),$$

where $X_2$ indicates the strength (cps) of Ca obtained by the EPMA analysis, $Y_2$ indicates the strength ratio (%) of Ca, and $c_2$ and $d_2$ are constants of the second calibration curve of Ca Next, the exemplary embodiment performed the alkali corrosion test of the test samples 1 to 13 and the comparative samples 1 to 13, and evaluated the corrosion resistance of each of the test samples 1 to 13 and the comparative samples 1 to 13.

Specifically, the alumina sintered body as each of the samples was immersed into a NaOH solution having a concentration of 1 mol/L for 10 minute. After the alumina sintered body was taken out from the NaOH solution, the alumina sintered body was placed at room temperature (25° C.) for 30 minute.

Next, the alumina sintered body was fired at a temperature within a range of 800 to 1000° C. for four hours.

The exemplary embodiment performed the X-ray diffraction measurement of each of desired areas in the alumina sintered body by using the X-ray diffraction device CMF-SmartLab manufactured by Rigaku Corporation under the same measurement conditions, previously described, that is, X ray: Cu—Kα ray; ACC. V: 40 kV; B.C.: 20 mA; Beam size: 0.3 mm; Measuring method: 2θ/θ method; Step: 0.02°, Measuring time: 5°/minute.

The 2θ/θ measurement was performed within the range of 20° to 60°.

This measurement detected the presence of compound crystals such as $Na_{1.65}A_{1.65}Si_{0.35}O_4$ or $Ca_2Al_2SiO_7$ generated in the alumina sintered body by the NaOH corrosion.

Specifically, the exemplary embodiment judged the presence of crystals of each of the compounds such as $Na_{1.65}A_{1.65}Si_{0.35}O_4$ and $Ca_2Al_2SiO_7$ when the peak height intensities of not less than three were present within a range of ±0.5 of the values stored in the database of the ICDD.

A description will now be given of the results of the X-ray diffraction of the test samples and the comparative samples with reference to FIG. 7 and FIG. 8.

Figure 7:
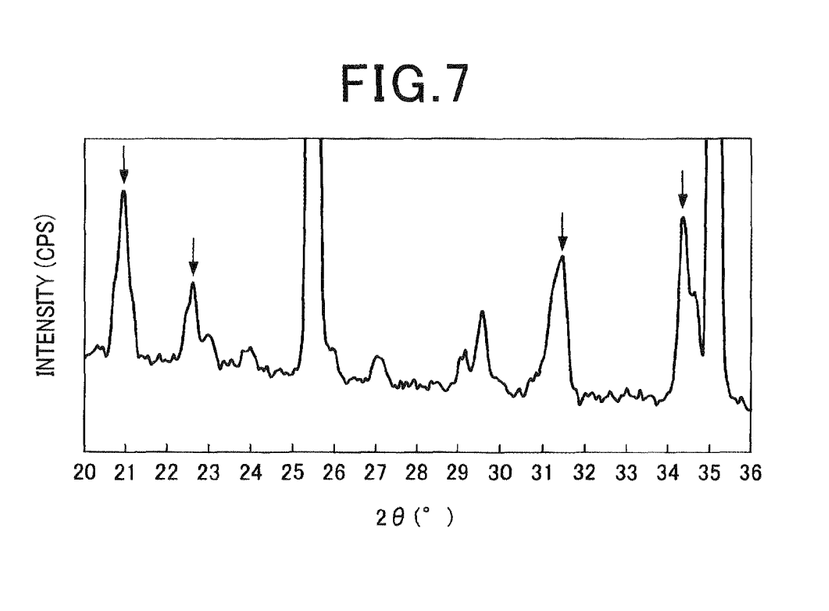
FIG. 7 is a view showing a X-ray diffraction pattern of the alumina sintered body according to a comparative sample 2 after performing an alkali corrosion test.
Figure 8:
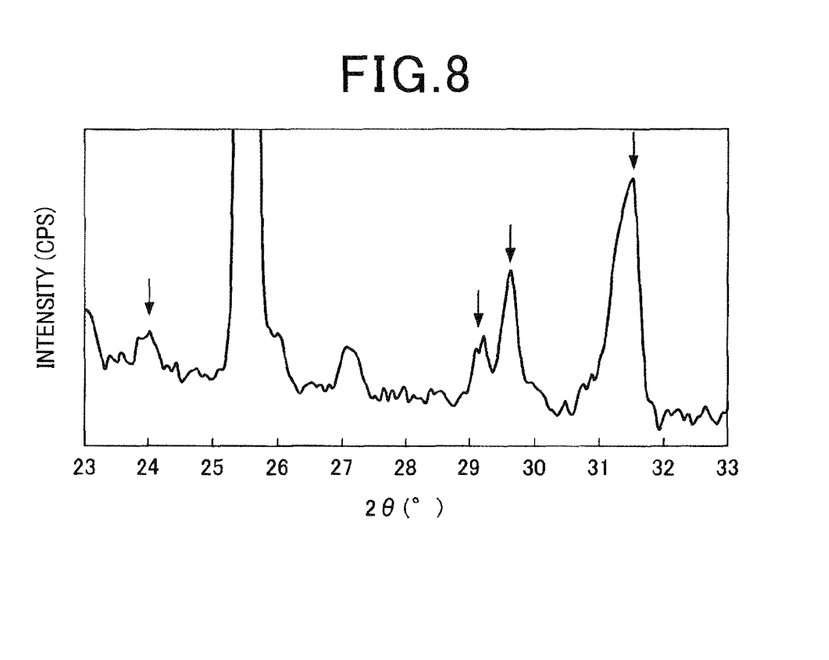
FIG. 8 is a view showing a X-ray diffraction pattern of the alumina sintered body according to a comparative sample 5 after performing the alkali corrosion test.

FIG. 7 is a view showing a X-ray diffraction pattern of the alumina sintered body according to the comparative sample 2 after performing the alkali corrosion test. FIG. 8 is a view showing a X-ray diffraction pattern of the alumina sintered body according to the comparative sample 5 after performing the alkali corrosion test.

For example, the peak height intensities derived from the compound $Na_{1.65}A_{1.65}Si_{0.35}O_4$ are shown in FIG. 7. Further, the peak height intensities derived from the compound $Ca_2Al_2Si_{0.35}O_7$ are shown in FIG. 8.

The exemplary embodiment judges the results of the alkali corrosion test of each of the test samples 1 to 13 and the comparative samples 1 to 13. That is, the exemplary embodiment judges whether or not each of the test samples and the comparative samples is good or defective, where it is determined that the sample is good when no crystal of the compound is present therein. On the other hand, it is judged that the sample is defective when crystals of the compound are present therein. The following Table 1 shows the evaluation results of the alkali corrosion test of each of the test samples 1 to 13 and the comparative samples 1 to 13.

TABLE 1

| Sample No. | Alumina content (mass %) | Ratio (%) of peak height intensity | Ratio (%) in area of Second dispersed phase | Judgment results of Alkali corrosion test |
| --- | --- | --- | --- | --- |
| Test sample 1 | 93.5 | 5.5 | 7.3 | Good |
| Test sample 2 | 92.2 | 9.4 | 15.2 | Good |
| Test sample 3 | 95.3 | 6.5 | 12.8 | Good |
| Test sample 4 | 97.7 | 13.4 | 2.3 | Good |
| Test sample 5 | 92.0 | 18.5 | 9.2 | Good |
| Test sample 6 | 93.5 | 16.9 | 14.2 | Good |
| Test sample 7 | 95.6 | 15.7 | 4.8 | Good |
| Test sample 8 | 93.4 | 23.3 | 7.3 | Good |
| Test sample 9 | 95.6 | 10.5 | 6.2 | Good |
| Test sample 10 | 90.3 | 22.8 | 11.5 | Good |
| Test sample 11 | 97.6 | 20.7 | 6 | Good |
| Test sample 12 | 90.2 | 13.5 | 14.4 | Good |
| Test sample 13 | 95.6 | 8.1 | 4.4 | Good |
| Comparative sample 1 | 82.2 | 9.7 | 43.3 | Defective |
| Comparative sample 2 | 90.5 | 17.8 | 18.5 | Defective |
| Comparative sample 3 | 87.3 | 4.5 | 19.6 | Defective |
| Comparative sample 4 | 85.3 | 6.1 | 46.6 | Defective |
| Comparative sample 5 | 94.6 | 4.9 | 11.7 | Defective |
| Comparative sample 6 | 88.8 | 11.5 | 17.5 | Defective |
| Comparative sample 7 | 84.6 | 6.8 | 32.3 | Defective |
| Comparative sample 8 | 85.5 | 23.4 | 26.7 | Defective |
| Comparative sample 9 | 87.6 | 15.1 | 32.7 | Defective |
| Comparative sample 10 | 85.6 | 20.3 | 43.1 | Defective |
| Comparative sample 11 | 82.2 | 3.8 | 7.9 | Defective |
| Comparative sample 12 | 89.6 | 25.8 | 21.2 | Defective |
| Comparative sample 13 | 85.8 | 25.7 | 43.5 | Defective |

Figure 9:
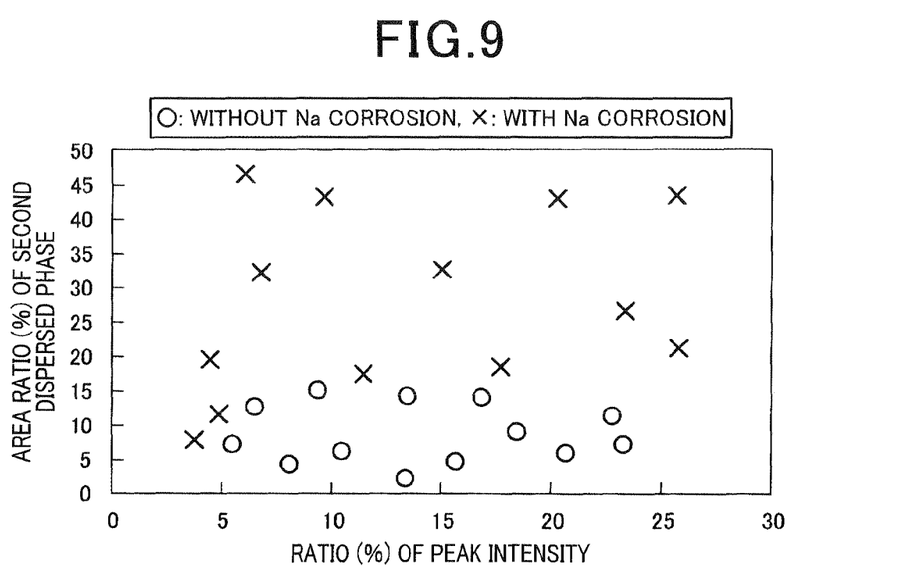
FIG. 9 is a view showing a relationship between the peak height intensity, the area of the second dispersion phase and the judgment results of the alkali corrosion test of the alumina sintered body of each of the test samples 1 to 13 and the comparative samples 1 to 13.

FIG. 9 is a view showing a relationship between the peak height intensity, an area of the second dispersion phase 4 and the judgment results of the test samples 1 to 13 and the comparative samples 1 to 13 of the alkali corrosion test. As can be clearly understood from the experimental results shown in Table 1 and FIG. 9, each of the test samples 1 to 13 has superior corrosion resistance against alkali, where in each of the test samples:

the content of the main phase made of alumina crystals is within a range of not less than 90 mass % to less than 98 mass %;

the peak height intensity of the first dispersed phase is not less than 5.5% ($100 \times I_2/I_1 \geq 5.5\%$); and the area ratio of the second dispersed phase on the surface of the alumina sintered body is not more than 5.2%.

On the other hand, as shown in Table 1 and FIG. 9, each of the comparative samples 1 to 13 has insufficient corrosion resistance against alkali because each of the comparative samples 1 to 13 does not satisfy the specific range of each of the content of the main phase made of alumina crystals, the peak height intensity of the first dispersed phase and the area ratio of the second dispersed phase on the surface of the alumina sintered body previously described.

That is, as can be understood from the experimental results shown in Table 1 and FIG. 9, it is possible for the alumina sintered body to have a superior corrosion resistance against alkali by adjusting each of the content of the main phase made of alumina crystals, the content of the first dispersed phase made of spinel, and the content of the second dispersed phase made of $SiO_2$ and/or CaO on the surface of the alumina sintered body to the specific range, like the test samples 1 to 13 as the alumina sintered body according to the exemplary embodiment.

A description will now be given of the spark plug 5 according to the exemplary embodiment shown in FIG. 1.

It is possible for the spark plug 5 to have a superior corrosion resistance when the insulator 52 of the spark plug 5 is made of the alumina sintered body 1 as each of the test samples 1 to 13. That is, it is possible to apply the spark plug 5 to an internal combustion engine using a fuel which contains alkali impurities, for example sodium (Na).

Specifically, it is possible to apply an internal combustion engine of a motor vehicle using alcohol fuel, for example.

It is preferable to produce the alumina sintered body 1 by firing a mixture of alumina, magnesia and silica and/or calcia. This makes it possible to easily produce the alumina sintered body having a superior alkali corrosion resistance after the firing process of the mixture of alumina, magnesia and silica and/or calcia.

It is further preferable for silicon dioxide powder and calcium oxide powder, to be used for producing the alumina sintered body, to have a BET (Brunauer-Emmett-Teller theory) specific surface area of not less than 4.0 m²/g. This structure makes it possible to easily produce the alumina sintered body having a superior alkali corrosion resistance. Each of the test samples 1 to 13 as the alumina sintered body according to the exemplary embodiment was produced by using silicon dioxide (silica) powder and/or calcia powder having a BET specific surface area of not less than 4.0 m²/g. By the way, this structure of the alumina sintered body has a risk of deterioration of a voltage resistance because of reducing a molding density of the alumina sintered body by increasing the friction between particles. In order to avoid this, it is preferable for the silicon dioxide (silica) powder and/or calcia powder to have the BET specific surface area of not more than 50 m²/g.

In addition, when the area ratio of the second dispersed phase on the surface of the alumina sintered body is not more than 15.2%, it is possible to fire the raw materials at a low temperature to produce the alumina sintered body by increasing the addition amount of silicon dioxide powder and the calcium oxide powder. This makes it possible to provide the alumina sintered body having a highly sintered density and superior thermal shock resistance.

It is preferable for the alumina sintered body to have a relationship of $100 \times I_2/I_1 \geq 23.3\%$, where $I_1$ indicates a peak height intensity derived from alumina, and $I_2$ indicates a peak height intensity derived from $MgAl_2O_4$. That is, it is preferable for the spinel to have its ratio of not more than a predetermined amount in the alumina sintered body. This structure makes it possible to have the superior alkali corrosion resistance properties previously described, and for the alumina sintered body to have a highly sintered density and the adequate voltage resistance properties. This makes it possible to apply the alumina sintered body to the insulator of the spark plug.

The spark plug 5 shown in FIG. 1 has a superior alkali corrosion resistance because of being equipped with the insulator 52 made of the alumina sintered body as each of the test samples 1 to 13 previously described. Accordingly, it is possible to apply the spark plug 5 to an internal combustion engine using fuel containing alkali impurities containing sodium (Na).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An alumina sintered body comprising:
a main phase made of alumina crystals;
a first dispersed phase made of $MgAl_2O_4$ dispersed in the main phase; and
a second dispersed phase made of $SiO_2$ and/or CaO dispersed in the main phase,
wherein a content ratio of the main phase is within a range from not less than 90% to less than 98%,
the alumina sintered body satisfies a relationship of $10033 I_2/I_1 \geq 5.5\%$, where $I_1$ indicates a maximum peak height intensity derived from alumina and $I_2$ indicates a maximum peak height intensity derived from $MgAl_2O_4$ in a X-ray diffraction of the alumina sintered body, and
an area ratio of the second dispersed phase on a surface of the alumina sintered body is not more than 15.2%.

2. The alumina sintered body according to claim 1, wherein the alumina sintered body is made of a fired mixture of alumina, magnesia and silica and/or calcia.

3. The alumina sintered body according to claim 1, wherein the alumina sintered body satisfies the relationship of $100 \times I_2/I_1 \geq 23.3\%$.

4. The alumina sintered body according to claim 2, wherein the alumina sintered body satisfies the relationship of $100 \times I_2/I_1 \geq 23.3\%$.

5. The alumina sintered body according to claim 1, wherein the alumina sintered body is used as an insulator of a spark plug in an internal combustion engine using alcohol fuel.

6. The alumina sintered body according to claim 2, wherein the alumina sintered body is used as an insulator of a spark plug in an internal combustion engine using alcohol fuel.

7. The alumina sintered body according to claim 3, wherein the alumina sintered body is used as an insulator of a spark plug in an internal combustion engine using alcohol fuel.

8. A spark plug comprising an insulator made of the alumina sintered body according to claim 1.

9. A spark plug comprising an insulator made of the alumina sintered body according to claim 2.

10. A spark plug comprising an insulator made of the alumina sintered body according to claim 3.

\* \* \* \* \*

UNITED STATES PATENT AND TRADEMARK OFFICE
CERTIFICATE OF CORRECTION

PATENT NO.        : 9,583,916 B2
APPLICATION NO.   : 15/053256
DATED             : February 28, 2017
INVENTOR(S)       : Imada et al.

It is certified that error appears in the above-identified patent and that said Letters Patent is hereby corrected as shown below:

In the Claims

At Column 12, Line 48, replace --a relationship of 10033 $I_2/I_1 \geq 5.5\%$-- with "a relationship of 100 X $I_2/I_1 \geq 5.5\%$" and At Column 12, Lines 51-52, replace --in a X-ray diffraction-- with "in X-ray diffraction"

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*